(12) United States Patent
Fox, Jr.

(10) Patent No.: US 7,850,138 B1
(45) Date of Patent: Dec. 14, 2010

(54) BATTERY SECURITY DEVICE

(76) Inventor: Charles W. Fox, Jr., 209 E. downington Ave., Salt Lake City, UT (US) 84115

( * ) Notice: Subject to any disclaimer, the term of this patent is extended or adjusted under 35 U.S.C. 154(b) by 1027 days.

(21) Appl. No.: 11/644,560

(22) Filed: Dec. 21, 2006

(51) Int. Cl.
*A47B 97/00* (2006.01)

(52) U.S. Cl. ...................................... 248/500; 248/552

(58) Field of Classification Search ................ 248/500, 248/503, 505, 552; 180/68.5; 250/381; 70/258
See application file for complete search history.

(56) References Cited

U.S. PATENT DOCUMENTS

| | | | | |
|---|---|---|---|---|
| 3,139,261 A | * | 6/1964 | Tinnerman | 248/505 |
| 3,557,895 A | * | 1/1971 | Thomas | 180/68.5 |
| 3,866,704 A | * | 2/1975 | Bowers et al. | 180/68.5 |
| 4,249,403 A | * | 2/1981 | Littlejohn | 70/230 |
| 4,936,409 A | * | 6/1990 | Nix et al. | 180/68.5 |
| 5,052,198 A | * | 10/1991 | Watts | 70/58 |
| 5,377,947 A | * | 1/1995 | Johnson | 248/503 |
| 6,102,356 A | * | 8/2000 | Huntley et al. | 248/500 |
| 6,827,169 B1 | * | 12/2004 | Van Hout et al. | 180/68.5 |
| 6,871,829 B2 | * | 3/2005 | Shannon, Jr. | 248/505 |
| 7,454,827 B2 | * | 11/2008 | Brown et al. | 29/506 |
| 2002/0170792 A1 | * | 11/2002 | Phelan et al. | 188/378 |

* cited by examiner

*Primary Examiner*—Ramon O Ramirez
(74) *Attorney, Agent, or Firm*—Brian C. Trask

(57) ABSTRACT

A battery hold-down clamp effective to resist theft of a battery from a vehicle, such as an RV, boat, automobile, and the like. One version includes a metal strap that is bent to form a loop having a cross-section profile substantially in agreement with a held cross-section of a battery, or battery container. The metal strap is hinged, to permit the loop to be opened for its installation. A portion of anchor structure and the battery are then enclosed within the loop. The strap resists moving the battery away from the anchor structure. After the strap is placed around a battery and anchor, a lock is installed to resist opening of the loop and extraction of the battery in a radial direction. A structural interference may be formed between the installed strap and protruding structure associated with the battery, thereby resisting extraction of the battery from the loop in an axial direction.

19 Claims, 3 Drawing Sheets

BATTERY SECURITY DEVICE

BACKGROUND

1. Field of the Invention

This invention relates to devices that require an electric battery during the course of their conventional operation, such as certain boats, recreation vehicles (RVs), and automobiles. It is particularly directed to an improved hold-down structure adapted to resist theft of such battery.

2. State of the Art

Many vehicles require a battery to store electrical power for use when a hard-wired electric utility (e.g. 110 or 220 volts) is not available. For example, RVs typically employ one or more battery to operate lights, fans, and certain appliances, such as a refrigerator, or television. Particularly in the case of boats and RVs, such batteries desirably are of the extra heavy duty cycle type, and are therefore relatively expensive.

Known battery hold-down devices are primarily functional only to resist movement of the battery with respect to the support foundation on which the battery rests during conventional operation of the vehicle. One such hold-down includes a clamping bar spanning between a pair of threaded rods. The clamping bar is drawn into trapping engagement with the battery by tightening wing nuts along the axis of the threaded bars. Commonly, a battery for use in certain RVs may be disposed inside a commercially available plastic battery container, with the whole assembly then being lashed to a battery support foundation using a strap, such as a length of nylon webbing.

Unfortunately, batteries associated with various vehicles may become the target of thieves. The known battery hold-down structures lack a locking element operable to resist removal of the battery from its support by a thief armed with little more than a common wrench, and possibly a knife. Removal of a battery installed using known hold-down devices may simply entail backing off a couple of wing nuts by hand, loosening a few threaded fasteners using an adjustable wrench, and/or potentially cutting a piece of plastic or webbing. Beside the aggravation of not being able to operate the various appliances upon discovery of the theft, the victim of a battery theft must also bear the financial burden of replacing the battery.

It would be an improvement in the art to provide a battery hold-down device that is operable to resist removal of a battery by a thief. A further advance would provide a theft-resistant battery hold-down device that is also effective to retain a battery in an installed position during conventional operation of a vehicle.

BRIEF SUMMARY OF THE INVENTION

This invention provides a battery hold-down device adapted to resist theft of the battery. One embodiment structured according to certain principles of the invention includes a strap forming a loop having a cross-section profile substantially in agreement with a held cross-section of a battery, or battery container. One operable strap may be formed from a length of metal stock. Such a metal strap may be hinged, or include a flexible linkage, to permit enlargement of an opening in the loop. The opening is typically enlarged to permit installation of the strap to encircle a battery and anchoring structure. During installation of one embodiment of a hold-down device structured according to principles of the invention, a portion of anchor structure and the battery are enclosed within the loop. In any case, the installed strap is structured in harmony with the battery and anchor to resist moving the battery away from the anchor structure. After the strap is placed into engagement with a battery and a portion of anchoring structure, a lock is removably installed to resist opening of the loop and extraction of the battery in a radial direction. A structural interference is typically formed between the installed strap and protruding structure associated with the battery, or a battery container, thereby resisting extraction of the battery from the loop in an axial direction.

BRIEF DESCRIPTION OF THE DRAWINGS

In the drawings, which illustrate what is currently considered to be the best mode for carrying out the invention.

DETAILED DESCRIPTION OF THE ILLUSTRATED EMBODIMENT

Reference will now be made to the drawings in which the various elements of the illustrated embodiment will be given numerical designations and in which the invention will be discussed so as to enable one skilled in the art to make and use the invention. It is to be understood that the following description is only exemplary of the principles of the present invention, and should not be viewed as narrowing the claims which follow.

Figure 1:
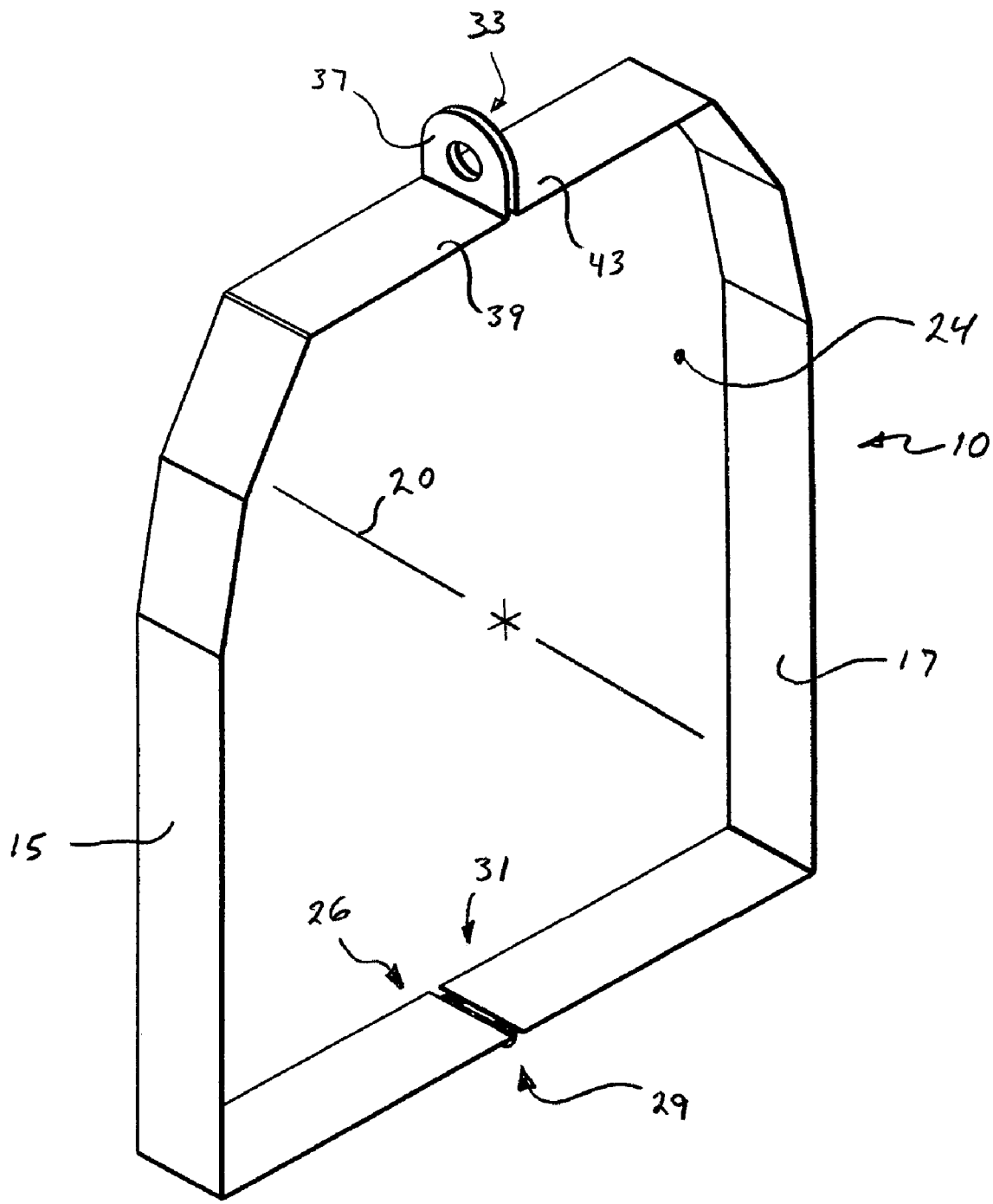
FIG. 1 is an elevation view in perspective of a currently preferred embodiment structured according to certain principles of the invention.

An exemplary battery hold-down strap, constructed according to certain principles of the instant invention, is illustrated in FIG. 1, and is generally indicated at 10. Strap 10 includes a first arm, or clamp member 15, and a second arm, or clamp member 17. It is currently preferred for arms 15, 17 to be made from a metal strap stock. Although it is currently preferred to use carbon steel to make an arm 15, 17, other metals, including stainless steel, Aluminum, and other alloys of metal are workable. Preferably, a hold-down strap 10 will naturally be, or will be treated to be, rust-resistant.

The illustrated and currently preferred embodiment 10 includes arms 15, 17, made from carbon steel and having a substantially rectangular cross-section sized about ⅛ inch by about one inch, or so. Such metal stock may conveniently be bent to form an enclosure having a profile that is generally in conformance with the shape of the object to be contained by the strap 10. Of course, it is within contemplation for an arm 15, 17 to be manufactured in alternative ways, and to include alternative materials that resist structural compromise (e.g. by simply cutting with a common knife), such as metal cable, or braided materials.

Battery hold-down strap 10 may be regarded as forming an interrupted encircling member that is radially disposed as an irregular shape about axis 20. Axis 20 may be regarded as being disposed in space to pass through holding enclosure 24 and in a direction oriented generally transverse to clamp member 15. As illustrated, axis 24 is approximately orthogonal to a plane passing through, or reasonably defined by, arms 15 and 17. Axis 20 may alternatively be defined as being substantially parallel to a principle axis of a battery that is installed in the enclosure 24.

The illustrated hold-down strap 10 is configured to permit its installation around a battery and a portion of anchor structure. A first end, generally 26, of arm 15 is affixed to a hinge, generally 29. Similarly, a first end, generally 31, of arm 17 is affixed to hinge 29. It is currently preferred that the attachment of arms 15, 17 to the hinge 29 be substantially permanent, to resist disassembly of the strap without requiring more than simple hand tools, such as a screwdriver, and/or one or more wrench. Operable fastening techniques include welding, spot welding, riveting, and the like.

It is currently preferred for arms 15, 17 to be symmetrically disposed with respect to a plane passing through hinge 29. Such construction simplifies manufacture of a strap 10 by reducing the number of different parts required to manufacture the assembly 10. The arms 15, 17 can therefore be stamped using the same form or die.

Locking structure, generally indicated at 33, is provided to resist enlarging the adjustable opening 35 (see FIG. 2) after the hold-down strap 10 is installed. Illustrated locking structure 33 includes upstanding ear 37 carried at a second end 39 of arm 15, and upstanding ear 41 carried at second end 43 of arm 17. Alternative workable locking structure includes a ring and hasp arrangement. Additional structure that may be encompassed within locking structure 33 typically includes a lock mechanism 45 operable in cooperation with locking structure, such as ears 37, 41, to resist enlarging the adjustable opening 35. A workable lock mechanism 45 includes a key-operated lock, combination lock, or other removable locking apparatus operable to resist undesired opening by an unknown third party, e.g. a thief.

Figure 2:
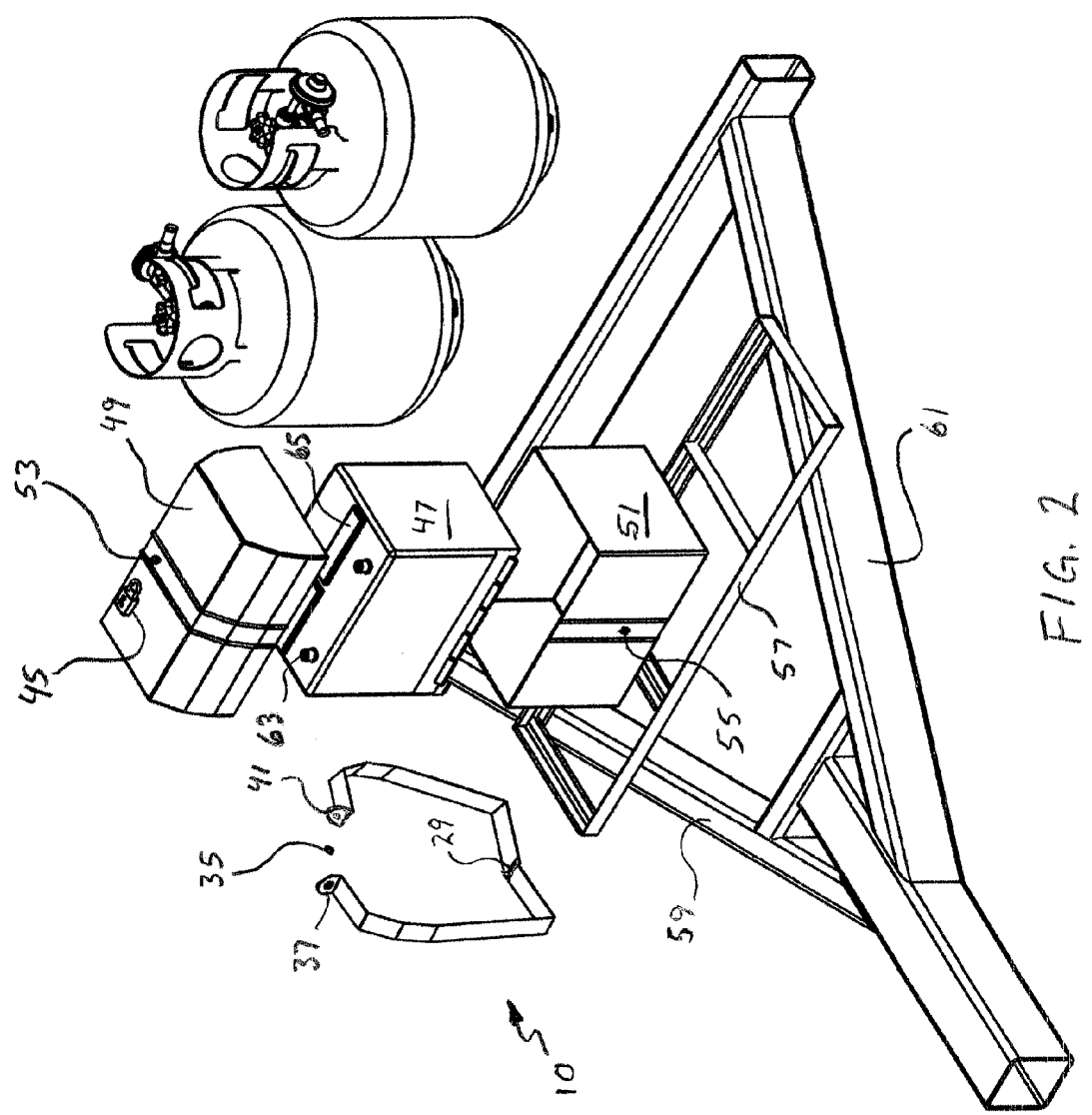
FIG. 2 is an exploded assembly view in perspective of the embodiment of FIG. 1 in association with a portion of a trailer-type RV.

With reference now to FIG. 2, embodiment 10 is illustrated in association with a conventional battery-supporting arrangement for a trailer-type RV. The battery 47 is often enclosed inside a commercially available battery enclosure, including enclosure top 49 and enclosure bottom 51, to provide a measure of protection from the weather. One representative commercially available battery enclosure includes a groove 53 disposed in top portion 49. Sometimes, a cooperating groove 55 may be formed in bottom portion 51. In any case, groove 53 is adapted to accommodate a length of webbing (not illustrated) employed to hold the battery in association with an anchoring support foundation, such as a frame including cross-bar 57. Cross-bar 57 is affixed, typically by welding, to trailer members 59 and 61. A length of webbing can therefore be wrapped or looped around both cross-bar 57 and the battery enclosure to hold the enclosure in association with the battery support. Typically, such webbing is secured with some sort of fastener, such as a spring-loaded buckle. Unfortunately, such webbing is subject to being removed by an unknown third party. Even if the webbing loop size were to be controlled by a locking mechanism, the webbing would still be subject to removal by simply cutting it with a knife. Certain embodiments structured according to principles of the instant invention may be employed in place of such webbing.

Figure 3:
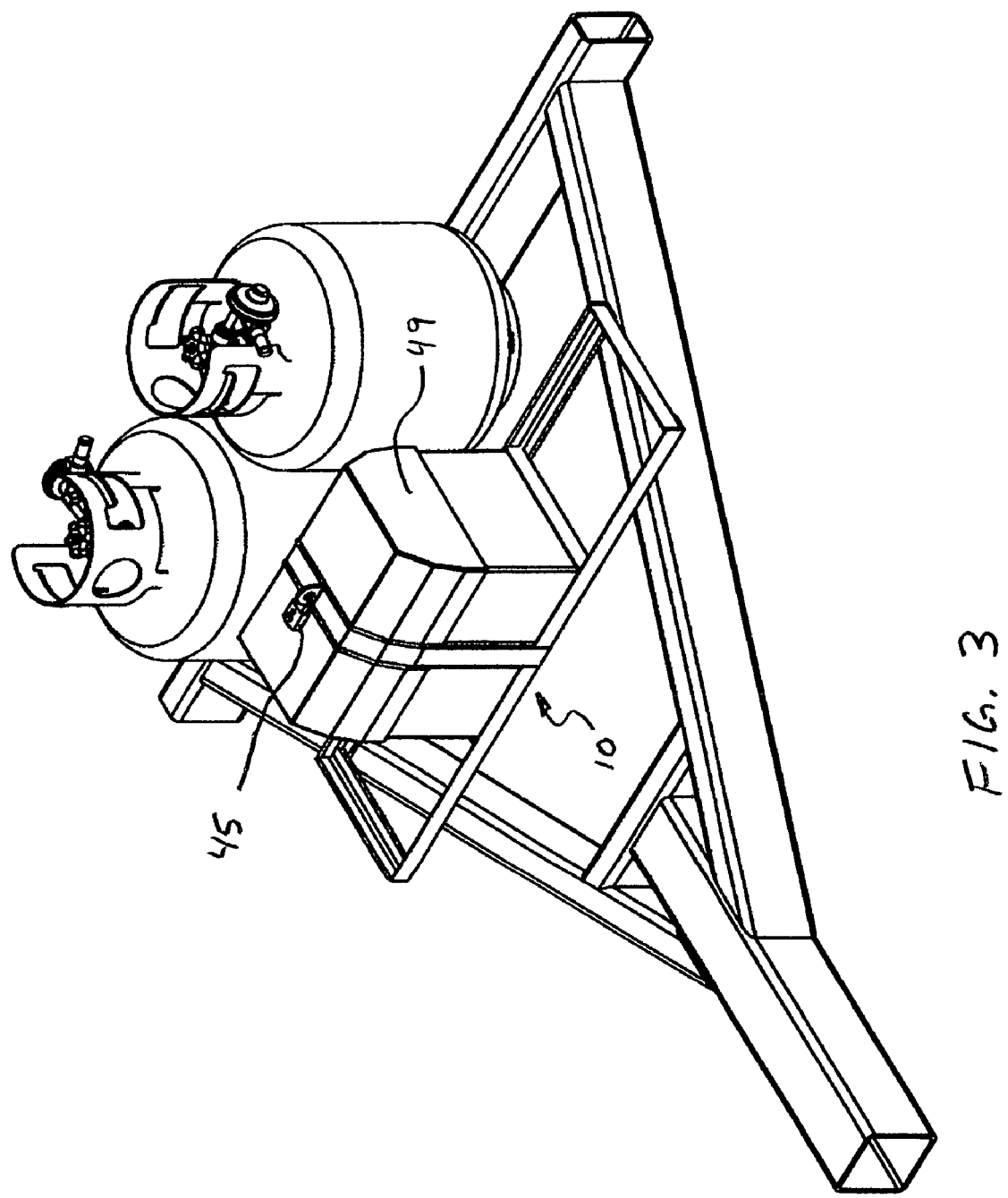
FIG. 3 is a view in perspective of the embodiment of FIG. 1 in assembled association with a portion of a trailer-type RV.

As shown in FIGS. 1 and 3, upstanding ears 37, 41 may be disposed substantially in parallel when the strap 10 is in an installed position with respect to a battery. An offset, or suitably sized remnant spacing between ears 37, 41, permits a clamping force to be generated by installation of locking mechanism 45. That is, in certain desired embodiments of hold-down strap 10, the encircling member 10 is configured in harmony with a size of a held cross-section so that installation of a locking mechanism 45 places a portion of the held structure into compression. Said another way, a portion of certain installed straps 10 are desirably configured to apply a radial loading onto structure contained within a cross-section defined by encircling member 10. Such is useful, for example, ensure creation of, and to resist an unknown third party from destroying, an axially oriented structural interference formed between structure of hold-down clamp 10 and structure associated with a battery. For example, one such structural interference is effective to resist axial displacement of the battery relative to strap 10 (e.g. in a direction parallel to axis 20, or generally transverse to first clamp member 15) by helping to ensure that a portion of strap 10 is seated in groove 53 upon installation of strap 10 around a battery.

Groove 53 is one exemplary structure effective to resist axial displacement of a strap 10 from theft-resistant holding association with a battery 47. However, it is within contemplation for alternative structure, such as electrodes 63, or electrolyte fill caps 65, to perform an equivalent function. Therefore, a battery enclosure is not required for practice of the invention—a bare battery may be securely held by certain embodiments structured according to principles of the instant invention.

It also should be noted that a compression loading imparted by the strap 10 onto held structure is not a requirement in an operable hold-down clamp structured according to certain principles of the instant invention. It is sufficient that the strap 10, in harmony with other structure, be capable of resisting axial and radial extraction of a held battery by an unknown third party. By "resisting axial and radial extraction" it is meant that the cooperating hold-down structures are effective to defeat extraction of a battery from within a held position by an unknown third party unless such structure is damaged or destroyed. Furthermore, preferred embodiments of the hold-down strap 10 preclude either cutting the strap 10 using a knife, or partial disassembly of the strap 10 using hand tools consisting of a screwdriver, and one or more wrench.

With reference now to all of FIGS. 1-3, the illustrated strap 10 may be installed by enlarging the adjustable opening 35, and lifting the strap 10 vertically from below to encompass a portion of anchor structure 57 and the battery 47 contained inside holding enclosure 24. Portions of arms 15, 17 are engaged into groove 53 to form an axial structural interference when adjustable opening 35 is reduced in size. Then, locking mechanism 45 is engaged with locking structures 37, 41 effective to associate battery 47 with anchor 57, and to resist enlarging the opening 35.

While the invention has been described in particular with reference to a certain illustrated embodiment, such is not intended to limit the scope of the invention. The present invention may be embodied in other specific forms without departing from its spirit or essential characteristics. The scope of the invention is, therefore, indicated by the appended claims. All changes which come within the meaning and range of equivalency of the claims are to be embraced within their scope.

What is claimed is:

1. A hold-down clamp for a battery, comprising:
   an interrupted encircling member disposable about an axis to fit in close radial proximity to, and form an axial structural interference with, a portion of protruding structure associated with an installed said battery effective to resist undesired relative motion of said battery, in a direction along said axis and with respect to said encircling member, and thereby to resist axial separation of said battery from engagement inside said encircling member;
   a first locking structure associated with a first side of an adjustable opening defined by said encircling member;
   a second locking structure associated with a second side of said adjustable opening; and
   a removable and replaceable theft-deterring lock mechanism structured to engage said first locking structure and said second locking structure operably to resist enlarging said adjustable opening and thereby hold said battery in a retained relation with respect to a battery support effective to resist undesired radial displacement of said battery relative to said axis.

2. The hold-down clamp according to claim 1, wherein:
said encircling member comprises a strap configured to enclose, and thereby to entrap therein, a portion of said battery support and a cross-section of said battery.

3. The hold-down clamp according to claim 2, wherein:
said encircling member comprises a metal strap arranged to define a holding enclosure sized in general agreement with a cross-section of a held portion of said battery.

4. The hold-down clamp according to claim 2, wherein:
said encircling member comprises a metal strap arranged to define a holding enclosure sized in general agreement with a cross-section of a held portion of a battery container in which said battery is disposed.

5. The hold-down clamp according to claim 2, wherein:
said encircling member comprises a metal strap that is hinged to permit adjustment of the size of said adjustable opening.

6. The hold-down clamp according to claim 2, wherein:
said encircling member comprises a metal strap with first and second arms having their respective first ends affixed to a hinge;
said first locking structure comprises a first upstanding ear disposed at a second end of said first arm; and
said second locking structure comprises a second upstanding ear disposed at a second end of said second arm.

7. The hold-down clamp according to claim 6, wherein:
said first upstanding ear and said second upstanding ear are disposed substantially in parallel when said encircling member is in an installed position with respect to a battery.

8. The hold-down clamp according to claim 6, wherein:
said first arm and said second arm are symmetrically disposed with respect to a plane passing through said hinge.

9. The hold-down clamp according to claim 1, wherein:
a size of said adjustable opening may be adjusted by moving said first locking structure, in a circumferential direction, apart from said second locking structure.

10. The hold-down clamp according to claim 1, wherein:
installation of said lock mechanism causes said encircling member to apply a radial loading onto structure contained within a cross-section defined by said encircling member.

11. A battery hold-down clamp effective to resist theft of a battery from a vehicle, the hold-down clamp comprising:
a first clamp member carrying first locking structure at its first end and being adapted for association with an anchor at its second end operably to resist displacement of said first clamp member from association with said vehicle;
a second clamp member carrying second locking structure at its first end and being adapted for association with an anchor at its second end operably to resist displacement of said second clamp member from association with said vehicle; and
a removable and replaceable theft-deterring lock mechanism structured to engage said first locking structure and said second locking structure operably to resist enlarging an adjustable opening there-between effective to trap said battery in a retained relation with respect to said anchor, wherein:
said first clamp member is hinged at its said second end to permit changing a size of said adjustable opening.

12. The hold-down clamp according to claim 11, wherein:
said second clamp member is hinged at its said second end, to permit changing a size of said adjustable opening.

13. The hold-down clamp according to claim 12, wherein:
said second ends of said first and said second clamp members are affixed to a mutually shared hinge.

14. The hold-down clamp according to claim 13, wherein:
said first clamp member and said second clamp member are substantially symmetrical with respect to a plane passing through said shared hinge.

15. The hold-down clamp according to claim 11, wherein:
said first clamp member and said second clamp member are structured and arranged such that installation of said lock mechanism is effective to resist removal of a structural interference formed between structure of said hold-down clamp and structure associated with said battery effective to resist displacement of said battery in a direction generally transverse to said first clamp member.

16. The hold-down clamp according to claim 15, wherein:
said first clamp member and said second clamp member are structured and arranged such that installation of said lock mechanism causes said first clamp member to apply a compression loading onto structure contained within said hold-down clamp.

17. A battery hold-down clamp effective to resist removal of a battery from an anchor associated with a vehicle, the hold-down clamp comprising:
a metal strap comprising a first arm and a second arm, respective first ends of said first arm and said second arm being affixed to a common hinge, said metal strap being configured to encircle, and to confine therein, anchor structure and a cross-section of said battery;
a first upstanding ear disposed at a second end of said first arm;
a second upstanding ear disposed at a second end of said second arm;
a removable and replaceable theft-deterring lock mechanism structured to engage said first upstanding ear and said second upstanding ear operably to resist enlarging an adjustable opening there-between effective to trap said battery in a retained relation with respect to said anchor.

18. The hold-down clamp according to claim 17, wherein:
said first arm and said second arm are structured and arranged in harmony with said lock mechanism such that installation of said lock mechanism causes a compression loading onto structure contained within said hold-down clamp.

19. The hold-down clamp according to claim 17, wherein:
said first arm and said second arm are structured and arranged in symmetry with respect to a plane passing through said hinge; and
a portion of said first arm is configured for reception in a groove formed in a battery enclosure, in which said battery is confined, effective to form an axially-oriented structural interference.

* * * * *